Figure 1B:
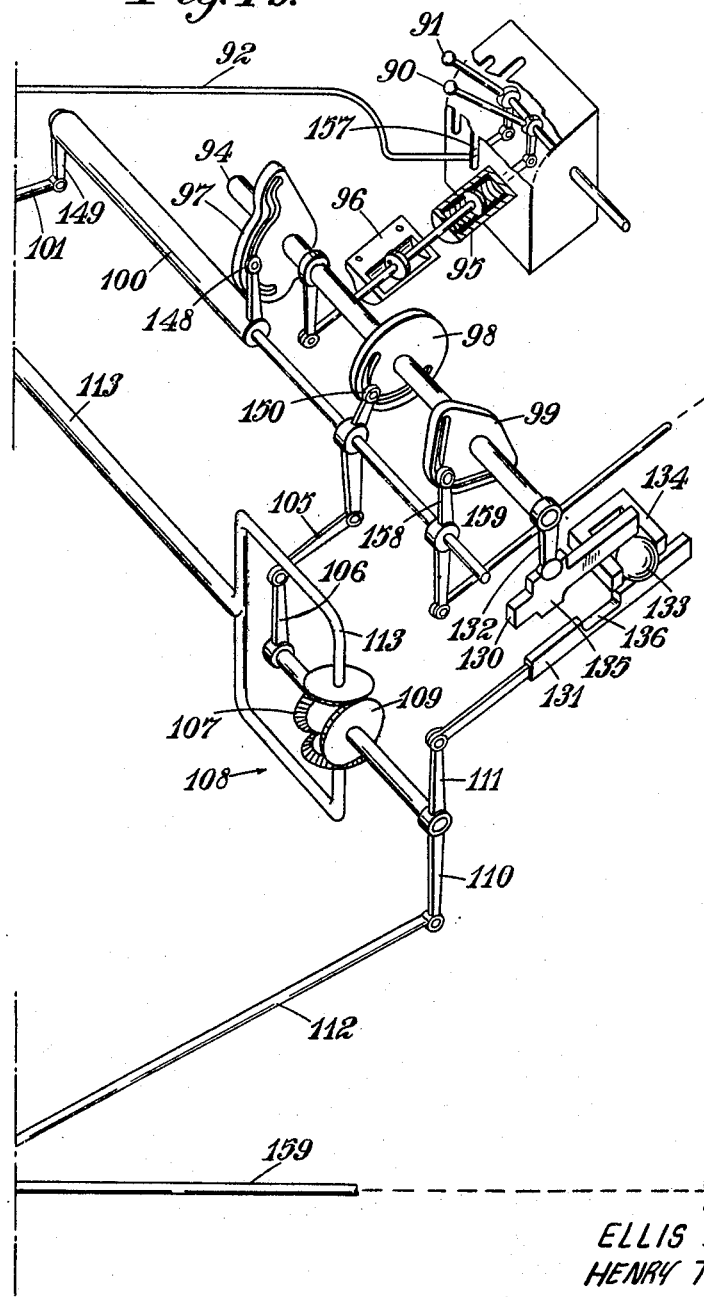

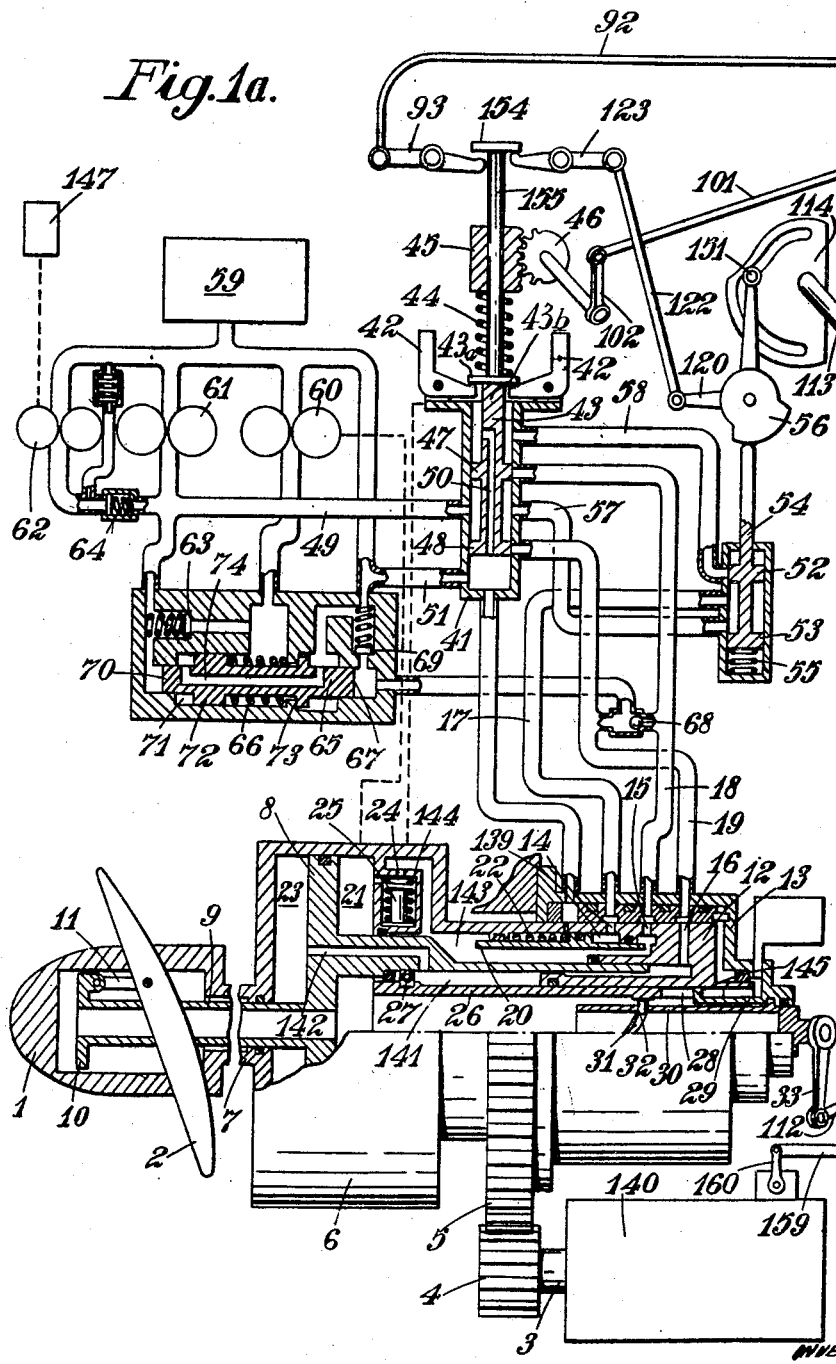

Feb. 19, 1957  E. DANVERS ET AL  2,781,856
CONTROL SYSTEM FOR VARIABLE PITCH SCREW PROPELLERS
Filed June 1, 1953  2 Sheets-Sheet 2

INVENTORS
ELLIS DANVERS &
HENRY TWITCHEN
BY Wilkinson & Mawkinney
ATTYS.

United States Patent Office 2,781,856
Patented Feb. 19, 1957

2,781,856

CONTROL SYSTEM FOR VARIABLE PITCH SCREW PROPELLERS

Ellis Danvers and Henry Twitchen, Gloucester, England, assignors to Rotol Limited, Gloucester, England, a British company Application June 1, 1953, Serial No. 358,863

Claims priority, application Great Britain June 6, 1952

9 Claims. (Cl. 170—135.74)

This invention relates to control systems for hydraulic variable pitch marine screw propellers in which means are provided for selective and automatic (constant speed) control, the object being to provide a system in which the principal control movements are performed by a single manual control member so that control of the system for manoeuvring is facilitated.

According to the present invention a control system for a hydraulic variable pitch screw propeller having a pitch change motor comprises a single manual control member which, over a first range of control movement, is arranged to control the supply of hydraulic fluid to the pitch change motor through a follow up system responsive to the pitch of the propeller so that each setting of said manual control member within said one range corresponds to a particular pitch of the propeller, and which, over a successive range of control movement, is arranged to control the supply of hydraulic fluid to the pitch change motor through a follow up system responsive to the speed of rotation of the propeller so that each setting of said manual control member within said successive range corresponds to a particular propeller speed.

Preferably, the first range of movement of said manual control member corresponds to pitch change of the propeller from maximum reverse pitch, through zero pitch to a predetermined forward pitch, and said manual control member is also arranged to control the power output of an engine driving the propeller, the arrangement being such that during movement of the manual control member through its first range, the power of the engine decreases as the propeller pitch reduces from maximum reverse pitch to zero pitch, and then increases as the propeller pitch increases from zero pitch to said predetermined forward pitch so that at said predetermined forward pitch a predetermined propeller speed is attained, and vice-versa, and that movement of said control member through said successive range of control movement alters the propeller speed and the power output of said engine in a desired relation.

One embodiment of the present invention will now be described with reference to the accompanying drawings, whereof Figures 1a and 1b are together a diagrammatic illustration of a control system for a marine propeller in accordance with the present invention, the system being illustrated in two parts which join together along the chain dotted lines on the right and left of the figures respectively.

In Figure 1a the hub of the variable pitch propeller is shown at 1 and one of the blades at 2. The propeller is driven by an engine 140 through a shaft 3, reduction gearing 4, 5, operating cylinder 6 and hollow shaft 7. The cylinder 6 contains a piston 8 connected by a shaft 9 to a crosshead 10 within the hub 1 and to which the blades 2 are connected by links 11. An extension 12 of the cylinder 6 surrounded by a stationary transfer casing 13 has three ports 14, 15 and 16 communicating respectively with three oil feed conduits 17, 18 and 19 leading from the casing. The port 14 communicates with a working chamber 139 on the right hand side of a piston carried by a sliding sleeve 20 the right hand end of which constitutes a valve arranged to close a passage from the port 15 to the working chamber 21 on the right hand side of the piston 8. This valve is hereinafter referred to as the hydraulic locking valve since, when closed by the action of a spring 22, it locks the piston 8 against movement, and when opened by pressure applied through the port 14 it allows such movement to take place. The port 16 communicates with the working chamber 23 on the left hand side of the pitch-changing piston 8 through annular passage 141 and passage 142. The passage indicated by reference numeral 143, from the port 15 to the working chamber 21 passes through a port 24 which is adapted to be closed by a valve member 25 which moves outwardly against the action of a spring 144 when the maximum allowable speed of rotation of the propeller is attained. A hollow shaft 26 is connected to the piston 8 by means of a ball race 27 so as to move axially with the piston 8, the shaft 26 being prevented from rotating by a slot 28 engaging a key 145 on a tubular extension 29 of the casing 13. Journalled in the extension 29 is a hollow shaft 30 having a spiral cam slot 31 engaging a pin 32 on the shaft 26. Pitch changing movements of the piston 8 are by these means converted to proportionate rotary movements of the shaft 30, the latter being provided with a solid end outside the casing 13 carrying a lever 33 by which these movements are transmitted to other parts of the system as presently described.

The sleeve 41 of a constant speed unit comprising flyweights 42 acting upon a regulating valve 43 through a collar 43a fixed to a valve stem portion 43b of the valve 43 against the action of a speeder spring 44 loaded by a rack and pinion 45, 46, is driven from the casing 6 by suitable gearing as indicated by the chain dotted line. The valve 43 comprises two control lands 47, 48 which normally shut off ports connected to the oil feed conduits 18 and 19 respectively. The space between the lands is at all times in communication with a supply conduit 49 through which oil under pressure is supplied by a system of pumps. From above and below the lands 47, 48 conduits 50, 51 return the oil to the low pressure side of the pumping system. The conduit 17 from the working chamber 139 of the hydraulic lock valve communicates with a port opening between the lands 52, 53 of a lock control valve 54 biassed by a spring 55 against a cam 56. A continuation 57 of the pressure conduit 49 supplies oil under pressure to the space between the lands, the entry port being placed so as to be shut off by the land 53 when the cam 56 allows the valve 54 to move upwardly in the drawing. The same movement opens another port previously closed by the land 52 and communicating through a conduit 58 and conduit 50 with the return conduit 51 so that pressure in the working chamber 139 is released and the hydraulic lock valve closes and prevents further change of pitch.

The pumping system comprises an oil storage tank 59, main and make-up pumps 60, 61 driven from the casing 6 and a feathering pump 62 driven by an independent motor 147. The make-up pump 61 delivers directly into the pressure conduit 49, while the main and feathering pumps deliver into the conduit through non-return valves 63 and 64 respectively. A by-pass from the upstream side of the non-return valve 63 to the low pressure side of the system is controlled by an unloading valve 65 biassed in the closing direction by a spring 66 and by pressure on face 67 obtained from whichever of conduits 18 and 19 is for the time being at the higher pressure by a shuttle valve 68. Excess pressure occurring when the piston 8 reaches the end of its stroke in either direction is relieved through a spring loaded valve 69. At the other end of the unloading valve 65 a cylindrical part 70 of somewhat smaller cross-sectional area than the face 67 operates in a cylindrical bore communicating with the downstream side of the non-return valve 63. The cylindrical bore is stepped up in diameter at 71 to form a working chamber for an enlargement 72 on the valve 65 equal in diameter to the valve seat 73, this working chamber communicating by a passage 74 through the valve body with the low pressure side of the system so that the valve 65 is balanced with reference to this pressure. During pitch changing the main and make-up pumps 60 and 61 both supply oil into the pressure conduit 49, but as the regulator valve 43 gradually shuts off the flow the delivery pressure of the pumps rises and, acting on the part 70, opens the unloading valve 65 so that the delivery of the main pump 60 is by-passed to the low pressure side of the system. Further rise of delivery pressure results in the valve part 70 leaving its cylindrical bore so that oil from the delivery of the make-up pump 61 is by-passed to the low pressure side. The opening of the unloading valve 65 is opposed by the pressure acting on the surface 67, the area of this latter being made sufficiently greater than that of the part 70 to allow a margin for pressure losses in the conduits, and it therefore follows that the discharge pressure of the pumping system is maintained at a value only slightly higher than that demanded at any time by the pitch-changing motor.

Referring now to Figure 1b the system is controlled during normal operation by a hand lever or manual control member 90, and an additional lever 91 is provided for feathering the blades, this lever acting through a transmission 92, 93 (Figure 1a) to lift the regulating valve 43 so that oil under pressure flows through the conduit 18, moves the piston 8 to the left hand end of its cylinder, and hence moves the blades 2 into their feathered settings. The hand lever 90 operates a cam shaft 94 through a transmission including a spring box 95 and a dashpot 96, so that if the lever is moved quickly the cam shaft follows up at a slower rate dependent upon the adjustment of the dashpot. The cam shaft 94 carries a speed cam 97, a pitch selection cam 98 and a fuel cam 99. The follower 148 of the speed cam 97 is connected by a transmission 100, 149, 101, 102 to the pinion 46 of the speeder spring loading sleeve 45 (see Figure 1a). The follower 150 of the cam 98 is connected by transmission 105 to a lever 106 on the shaft of one sunwheel 107 of a differential gear generally indicated at 108. The other sunwheel 109 is driven by a pivoted lever having two arms 110, 111, and the arm 110 is connected by transmission 112 to the lever 33 (Figure 1a) the movements of which are responsive to change of pitch. The planet carrier 113 of the differential 108 rotates a cam 114 (Figure 1a) the follower 151 of which moves the cam 56 and a lever 120 which is connected by transmission 122 to a lever 123 which engages a head 154 on the stem 155 of the regulating valve 43, and is arranged to lift the valve, or allow it to be lowered under the action of the spring 44.

When the lever 90 is within its first range of movement the loading of the speeder spring 44 as imparted by the cam 97 is always such that the flyweights 42 are unable to keep the regulating valve 43 raised to the neutral position in which the lands 47, 48 close the conduits 18 and 19 because the force exerted by the speeder spring due to the loading imparted to it by the cam 97 is always greater than the opposing force due to the flyweights at the comparatively low engine speeds employed in the first range of movement of the lever 90. In the first range of control movement, the cam 97 is designed to decrease the speeder spring loading from maximum reverse pitch to zero pitch, and then increase the speeder spring loading from zero pitch to a predetermined forward pitch, the force exerted by the speeder spring being kept at a value not less than the opposing force which can be exerted by the flyweights until at a predetermined forward pitch when the control lever is at the end of its first range of control movement the force exerted by the speeder spring is just balanced by the opposing force due to the flyweights which are then revolving at a speed proportional to the predetermined engine speed which the engine achieves when the control member reaches the end of its first range as hereinafter more fully described. Within the first range of movement of the lever 90, therefore, the regulating valve is supported by the lever 123 and the neutral position of the valve 43 corresponds to a middle position of the cam follower 151 on the cam 114. The neutral setting or position of the valve 43 means the setting of the valve required to hold the pitch change motor piston stationary so that the rate of adjustment of pitch is zero. Supposing now a change of pitch is required, movement of the hand lever 90 within its first range of control movement causes rotation of the sunwheel 107, and the other sunwheel 109, which is responsive to change of pitch, being stationary, the planet carrier 113 rotates and moves the cam 114 away from the neutral position so that the regulating valve 43 is moved by the lever 123 in the direction to change the pitch in the sense desired. As the change of pitch takes place the sunwheel 109 is rotated by the lever 33 so that the planet carrier 113 and the cam 114 move back to their neutral positions and returns the valve 43 to its neutral position. This movement of the hand lever 90 also adjusts cam 97 and therefore the loading of the speeder spring 44, but as already explained, this has no effect on the position of the regulating valve 43 which is controlled by the lever 123. The system operates therefore on the well known follow-up principle so that each position of the lever 106, and therefore of the hand lever 90, corresponds to a particular pitch. The system is so arranged that full reverse pitch is obtained when the hand lever 90 is at the bottom of its quadrant slot 157 in which position the followers 148, 150 are at the upper ends of their cam slots as viewed in Figure 1b. Upward and forward movement of the lever 90 progressively reduces the reverse pitch through cam 98, cam 114 and lever 123, cam 97 remaining non-effective on pitch change movements until zero pitch is obtained and then increases pitch in the forward direction through cam 98, cam 114 and lever 123, cam 97 still remaining non-effective. At the same time, the rotation of the cam-shaft 94 rotates the fuel cam 99 with the effect which will now be described. The cam 99 has a follower 158 connected by a transmission 159 to a throttle valve 160 controlling the fuel supply to the engine 140. The cam 99 has its minimum lift at the zero pitch setting, corresponding to minimum fuel supply and idle running of the engine, and increases the fuel supply progressively for astern and ahead running. The system is further so arranged that when the hand lever 90 is in a certain forward pitch setting, say 30° mean blade angle, the predetermined forward pitch previously referred to, the speed of rotation of the propeller has risen to a predetermined value. This marks the end of the first range of control movement of the lever 90, and as previously explained, the force exerted by the speeder spring 44 and the flyweights 42 just balance. Additionally, the cam 98 is so designed that when this position of the lever 90 is reached, the cam 98 has moved the lever 123 anti-clockwise in the drawing out of contact with the head 154, so that the regulating valve 43 is supported in its neutral position by the flyweights 42. The flyweights 42 then take charge of the movement of the regulating valve 43 in the well-known manner and prevent a further rise of speed except insofar as the speeder spring 44 is additionally loaded by the cam 97 which is moved by further movement of the hand lever 90 into its successive range of control movement in the upward and forward direction. The operative part of the cam 97 corresponding to movement of the lever 90 in its successive range of movement is designed progressively to reduce the loading on the speeder spring 44 as the lever 90 is moved upwardly and forwardly and vice versa so that each setting of the lever 90 in its successive range corresponds to a particular engine speed. The movement of the lever 90 in its successive range also of course rotates cams 98 and 99. The operative part of cam 98 corresponding to movement of the lever 90 in its successive range is designed to keep the lever 123 out of the way of the head 154 and prevent interference by the lever 123 while the lever 90 is in its successive range of control movement, the cam 98 and the pitch-responsive movements of the sunwheel 109 together determining the angular position of the cam 114 to retain the lever 123 in a non-effective position. The operative part of the fuel cam 99 corresponding to movement of the lever 90 in its successive range of control movement is appropriately shaped so that the fuel supply and therefore the power output of the engine is in a desired relation to the speed of the propeller as determined by the setting of the cam 97.

As already explained, the dashpot 96 delays the application of control movements by the hand lever 90 to the cam shaft 94, but nevertheless it does not entirely eliminate lag between the movement of the cam shaft and the attainment of the corresponding pitch, and therefore when selecting astern from an ahead setting, or vice versa, it would be possible for the fuel supply to go through the idling setting and be increased again before zero pitch was actually attained, so that the engine speed would rise undesirably on passing through zero pitch. To avoid this a locking device is provided to prevent the cam shaft 94 passing the zero setting until zero pitch has been attained. This device comprises two bars 130, 131 which are caused to slide lengthwise respectively by a lever 132 fixed to the cam shaft 94 and by the lever arm 111 of the pitch-responsive system. A ball 133 is trapped between the bars and the sides of a cage member 134 and acts as a stop for an abutment 135 on the bar 130 except when it can move into a recess 136 in the bar 131. The recess 136 is positioned to unlock the bar 130 only when the pitch setting of the propeller is zero. It will be observed that owing to the width of the ball and the abutment 135 the cam shaft is stopped somewhat before reaching its true zero pitch setting, but this is allowed for by suitably increasing the length of the recess 136 so that the cam shaft is released a little before true zero pitch is reached. A pitch indicator may be operated by transmission connected to the bar 131.

When the system is operating in the pitch selection range, i. e. the first range of movement of the hand lever 90, the regulating valve 43 is controlled by cam 114 but should a drift towards fine pitch occur, due for example to a fault in the hydraulic system, the cam 114 continues to turn in a clockwise direction until the cam 56 allows the hydraulic lock control valve 54 to operate to release the pressure in the conduit 17 so that the lock valve 20 moves towards the right under pressure of the spring 22 and closes the passage 143 to the working chamber 21. The piston 8 is thus locked against further fining-off of the pitch.

The centrifugally operated valve 25 is arranged to close when the propeller speed rises above the normal maximum by a predetermined amount, say 5%, and then prevents any reduction of pitch, which would result in a further increase of speed. This valve will not re-open until the pressure in chamber 21 drops sufficiently for the spring 144 to overcome the pressure force across the valve. This would only happen when the engine was shut down and the blade twisting moment reduced to a very low value. The valve could be reopened by using the feathering override but as this valve is put in primarily to cover the case of the governor unit valve sticking in fine pitch position it is assumed that the plant would be shut down immediately should the valve ever operate.

The flyweights 42 and the spring 44 comprise a propeller speed responsive means and the members 98, 107, 123 and 151 comprise an overridable transmission means. The collar 43a and the valve stem portion 43b comprise a transmission between the speed responsive means 42, 44, and the valve means 43 whereby the valve means is automatically adjusted during the second part of the movement of the manual control member 90.

We claim:

1. A control system for a variable pitch marine screw propeller having a hydraulic pitch change motor, said control system comprising a manual control member, means constraining said control member for movement in a single predetermined path, valve means to control the admission of hydraulic fluid to said pitch change motor, said valve means having a neutral setting corresponding to zero rate of adjustment of pitch; overridable transmission means from said control member to said valve means to effect adjustment of said valve means in one or the other sense from said neutral setting as said control member is moved in one or the other sense in a first part of said predetermined path and to allow adjustment of said valve about said neutral setting in a second part of said predetermined path; follow-up means operably interposed between said motor and said overridable transmission means responsive to pitch to cancel said adjustment whereby each position of said control member in said first part of said predetermined path corresponds to a particular pitch, the arrangement being such that when said control member is at the beginning of said first part of said predetermined path the pitch is maximum reverse and that as said control member is moved progressively from said beginning through said first part of said predetermined path to the end thereof the pitch changes progressively from maximum reverse through zero to a forward pitch substantially within the forward pitch range; engine power controlling means, a transmission from said control member to said power controlling means such that movements of said control member within said first part of said predetermined path controls engine power to prevent overspeeding of the engine at all pitches corresponding to positions of said control member within said first part of said predetermined path; propeller speed responsive means, a transmission between said speed responsive means and said valve means whereby the valve means is automatically adjusted during the second part of the movement of the manual control member, speed selection means for adjusting said speed responsive means to vary the setting of said valve means to which said speed responsive means tends to move said valve means at any particular speed, and transmission means from said control member to said speed selection means whereby movements of said control member in said second part of said predetermined path effect adjustment of said speed selection means.

2. A control system as claimed in claim 1 wherein said manual control member has a pitch control range and a speed control range and said valve means is operative both while the manual control member is in its pitch control range and while the manual control member is in its speed control range.

3. A control system as claimed in claim 1 wherein said valve means comprises a regulating valve to control the passage of hydraulic fluid to and from the pitch change motor, and said pitch responsive follow-up means comprises a differential gear, one element of which is rotatable in response to movement of said manual control member to adjust the pitch of the propeller, another element of which is rotatable in the opposite direction in response to the pitch change movement of the propeller effected, and a third element of which is driven by said first and second elements and is arranged to adjust said regulating valve, movement of the manual control member in its first range moving the regulating valve through the first and third elements of the differential gear from a neutral position to bring about the pitch change called for by such movement of said manual control member, the resultant pitch change movement returning said regulating valve to its neutral position through the second and third elements of the differential gear.

4. A control system as claimed in claim 1 wherein the power controlling means includes throttle means to control the power output of an engine driving the propeller, and wherein said transmission includes cam means arranged so that during movement of the manual control member through its first range of control movement said throttle means is actuated to reduce the power output of the engine as the propeller pitch reduces from maximum reverse pitch to zero pitch, and then increases as the propeller pitch increases from zero pitch to said predetermined forward pitch so that at said predetermined forward pitch a predetermined propeller speed is attained and vice versa, and during movement of said manual control member through its successive range of control movement said throttle means is actuated to alter the power output of the engine in a desired relation to the propeller speed.

5. A control system as claimed in claim 3 wherein said third element of the differential gear is a planet wheel mounted on a carrier which has a cam surface which adjusts said regulating valve through a follower and lever system, and wherein said first and second elements of the differential gear are sunwheels.

6. A control system as claimed in claim 3 wherein said manual control member is arranged to rotate a cam shaft having a cam surface which rotates said first element of the differential gear through a follower and lever system when said manual control member is adjusted.

7. A control system as claimed in claim 3 further comprising a pressure-operated normally-open lock valve closing of which prevents fining pitch change movements of the propeller, and wherein said third element of the differential gear is connected to control the pressure operating the lock valve so that said lock valve is closed in the event of the pitch of the propeller becoming finer than a pitch dependent on the pitch selected by the manual control member.

8. A control system as claimed in claim 5 further comprising a locking device which normally prevents said cam shaft rotating through a setting corresponding to a zero pitch of the propeller, said locking device being releasable by means responsive to pitch change movements of the propeller, when said propeller is in a zero pitch setting.

9. A control system as claimed in claim 6, wherein there is provided a constant speed unit, which constant speed unit includes said regulating valve, and wherein said cam shaft has a cam surface which adjusts the loading of the speeder spring of the constant speed unit so that in the first range of control movement of the manual control member said speeder spring is loaded to prevent adjustment of the regulating valve by the flyweights of the constant speed unit, but at said predetermined forward pitch the speeder spring loading is such that the flyweights of the constant speed unit override the control of said regulating valve by said third element of the differential gear whereupon movement of said manual control member in its successive range of control movement adjusts the loading of the speeder spring to adjust the propeller speed to be maintained by the constant speed unit.

References Cited in the file of this patent

UNITED STATES PATENTS

| | | |
|---|---|---|
| 2,353,566 | Keller | July 11, 1944 |
| 2,423,191 | Kopp | July 1, 1947 |
| 2,631,677 | Kochenburger et al. | Mar. 17, 1953 |
| 2,664,166 | Swaab | Dec. 29, 1953 |
| 2,664,959 | Stuart | Jan. 5, 1954 |

FOREIGN PATENTS

| | | |
|---|---|---|
| 688,020 | Great Britain | Feb. 25, 1953 |